(12) United States Patent
Lin et al.

(10) Patent No.: US 7,742,547 B2
(45) Date of Patent: Jun. 22, 2010

(54) METHOD AND SYSTEM FOR READING RFID TAGS

(75) Inventors: Chih-Hung Lin, Tainan County (TW);
Chia-Jen Yu, Taipei County (TW);
Jiunn-Tsair Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 640 days.

(21) Appl. No.: 11/752,309

(22) Filed: May 23, 2007

(65) Prior Publication Data

US 2008/0129505 A1    Jun. 5, 2008

Related U.S. Application Data

(60) Provisional application No. 60/868,543, filed on Dec. 5, 2006.

(51) Int. Cl.
*H04L 27/06* (2006.01)
(52) U.S. Cl. ..................................................... 375/341
(58) Field of Classification Search ................. 375/262, 375/340, 341
See application file for complete search history.

(56) References Cited

U.S. PATENT DOCUMENTS 5,649,295 A * 7/1997 Shober et al. .............. 340/10.1
2003/0156603 A1 * 8/2003 Rakib et al. ................ 370/485
2006/0098765 A1   5/2006 Thomas et al.
2009/0256750 A1 * 10/2009 Mathews et al. ............ 342/450
2009/0259939 A1 * 10/2009 Lockett et al. .............. 715/716

OTHER PUBLICATIONS

"A Robust Variable Step-Size LMS-Type Algorithm: Analysis and Simulations", Tyseer Aboulnasr and K. Mayyas, IEEE, p. 631-639, vol. 45 No. 3 1997.

* cited by examiner

*Primary Examiner*—Don N Vo
(74) *Attorney, Agent, or Firm*—Jianq Chyun IP Office

(57) ABSTRACT

A method and a system for reading radio frequency identification (RFID) tags are provided. The method includes the following steps. First, receive a tag signal from the RFID tag. Recover a data clock rate from the tag signal according to statistics of pulse lengths of the tag signal. Next, determine a frame synchronization point of a data frame following a preamble in the tag signal by a signal correlation between the preamble and a predetermined signal pattern according to the data clock rate. Finally, decode the data frame by using an adaptive Viterbi algorithm on an extended trellis diagram. The extended trellis diagram includes a plurality of nodes and a plurality of branches connecting the nodes. The nodes and the branches are arranged according to the modulation scheme of the data frame and possible variations of the data clock rate.

31 Claims, 10 Drawing Sheets

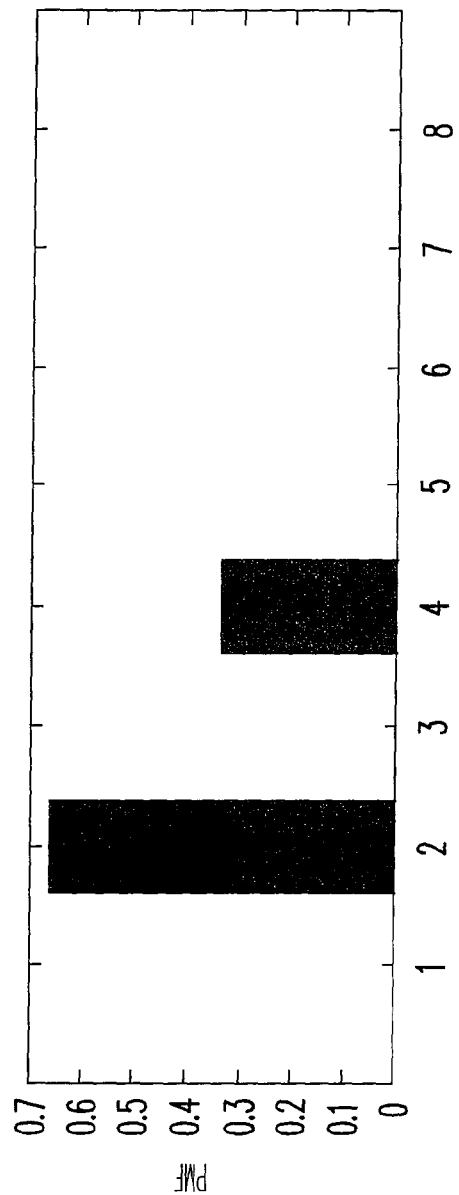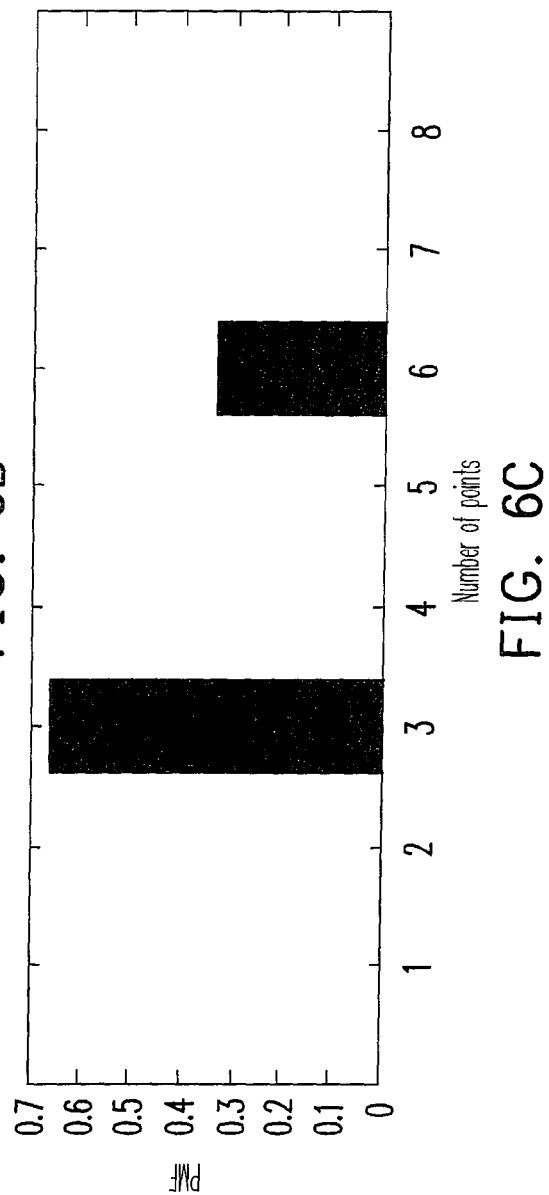
FIG. 6B
FIG. 6C

METHOD AND SYSTEM FOR READING RFID TAGS

CROSS-REFERENCE TO RELATED APPLICATION

This application claims the priority benefit of U.S. Provisional application Ser. No. 60/868,543, filed on Dec. 5, 2006. All disclosure of the U.S. provisional application is incorporated herein by reference.

BACKGROUND OF THE INVENTION

1. Field of the Invention

The present invention relates to a method and a system for reading radio frequency identification (RFID) tags. More particularly, the present invention relates to a method and a system for reading printed RFID tags.

2. Description of the Related Art

FIG. 1 is a schematic diagram showing a conventional RFID reader 101 and three RFID tags 102-104. The reader 101 emits ultra high frequency (UHF) or high frequency (HF) electromagnetic waves to enable the tags 102-104 so that the tags 102-104 can backscatter tag signals to the reader 101. The data sent by an RFID tag is modulated in the tag signal. In order to detect the data, the RFID reader has to receive the tag signal and then generate the data based on the tag signal. This data generation process is known as signal detection, decoding, or demodulation.

For example, the RFID tags 102-104 may use the FM0 modulation scheme to encode the data. FIG. 2 is a schematic diagram showing the four data patterns of the FM0 modulation scheme. There are four patterns S1-S4 in FIG. 2. S1 or S4 stands for a data symbol-1. S2 or S3 stands for a data symbol-0. According to the FM0 modulation scheme, there must be a level transition (from low level to high level or from high level to low level) between two consecutive symbols. FIG. 3 is a schematic diagram showing exemplary tag signal waveforms based on the FM0 modulation scheme, in which the waveform 301 is a perfect noise-free tag signal waveform.

There are two conventional methods for signal detection, namely, edge detection and matched filtering. Edge detection detects the transition of a tag signal waveform across the middle line 305, and then reconstructs the data bits according to the transition statistics of the waveform. For example, a data symbol-1 has no transition inside its symbol period; while a data symbol-0 has a transition at the middle of its symbol period. Edge detection is only practical for tag signal waveforms with relatively low noises. As shown in FIG. 3, the waveform 302 is a noisy tag signal waveform received at a distance of 2 meters, which carries the same data as the waveform 301. Although the waveform 302 is distorted by noises, its data pattern is still recognizable by edge detection. On the other hand, the waveform 303 is another noisy tag signal waveform received at a distance of 8 meters, which also carries the same data as the waveform 301. Severe noises cause many false crossings of the waveform 303 over the middle line 305. As a result, edge detection would misinterpret the data pattern.

Matched filtering is more noise-tolerant than edge detection. Matched filtering reconstructs the data bits by pattern matching between the data patterns S1-S4 and the tag signal waveform. However, for matched filtering to work correctly, the data clock rate of the tag signal must be stable and well known. Stable data clock rate is not always available, especially for printed RFID tags.

Printed RFID tags are literally printed by ink-jet printers. Printed RFID tags are much cheaper than conventional chip-based tags. However, printed RFID tags have the disadvantage of very unstable data clock rate. A 20-50% swing of data clock rate is typical. Furthermore, their data clock rate is always drifting. The data clock rate of a symbol may be different from the data clock rate of the next symbol. Consequently, it is impractical to apply either edge detection or matched filtering on noisy tag signals from printed RFID tags.

SUMMARY OF THE INVENTION

Accordingly, the present invention is directed to a method for reading a printed RFID tag. This method is more effective than conventional methods for reading data from printed RFID tags.

The present invention is also directed to a system for reading a printed RFID tag. This system solves the problems of clock recovery, synchronization and data frame decoding for noisy signals from printed RFID tags. As a result, this system is more effective than conventional ones for reading printed RFID tags.

According to an embodiment of the present invention, a method for reading a printed RFID tag is provided. The method includes the following steps. First, receive a tag signal from the RFID tag. Recover a data clock rate from the tag signal according to statistics of pulse lengths of the tag signal. Next, determine a frame synchronization point of a data frame following a preamble in the tag signal by a signal correlation between the preamble and a predetermined signal pattern according to the data clock rate. Finally, decode the data frame by using an adaptive Viterbi algorithm on an extended trellis diagram. The nodes and the branches of the extended trellis diagram are arranged according to possible variations of the data clock rate.

According to another embodiment of the present invention, a system for reading a printed RFID tag is provided. The system includes a receiver, a recovery module, a synchronization module, and a decoding module. The receiver receives a tag signal from the RFID tag. The recovery module is coupled to the receiver for recovering a data clock rate from the tag signal according to statistics of pulse lengths of the tag signal. The synchronization module is coupled to the recovery module for determining a frame synchronization point of a data frame following a preamble from the tag signal by a signal correlation between the preamble and a predetermined signal pattern according to the data clock rate. The decoding module is coupled to the synchronization module for decoding the data frame by using an adaptive Viterbi algorithm on an extended trellis diagram. The nodes and the branches of the extended trellis diagram are arranged according to possible variations of the data clock rate.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 6B-6D are pattern histograms of a noise-free received signal according to an embodiment of the present invention.

DESCRIPTION OF THE EMBODIMENTS

Figure 1:
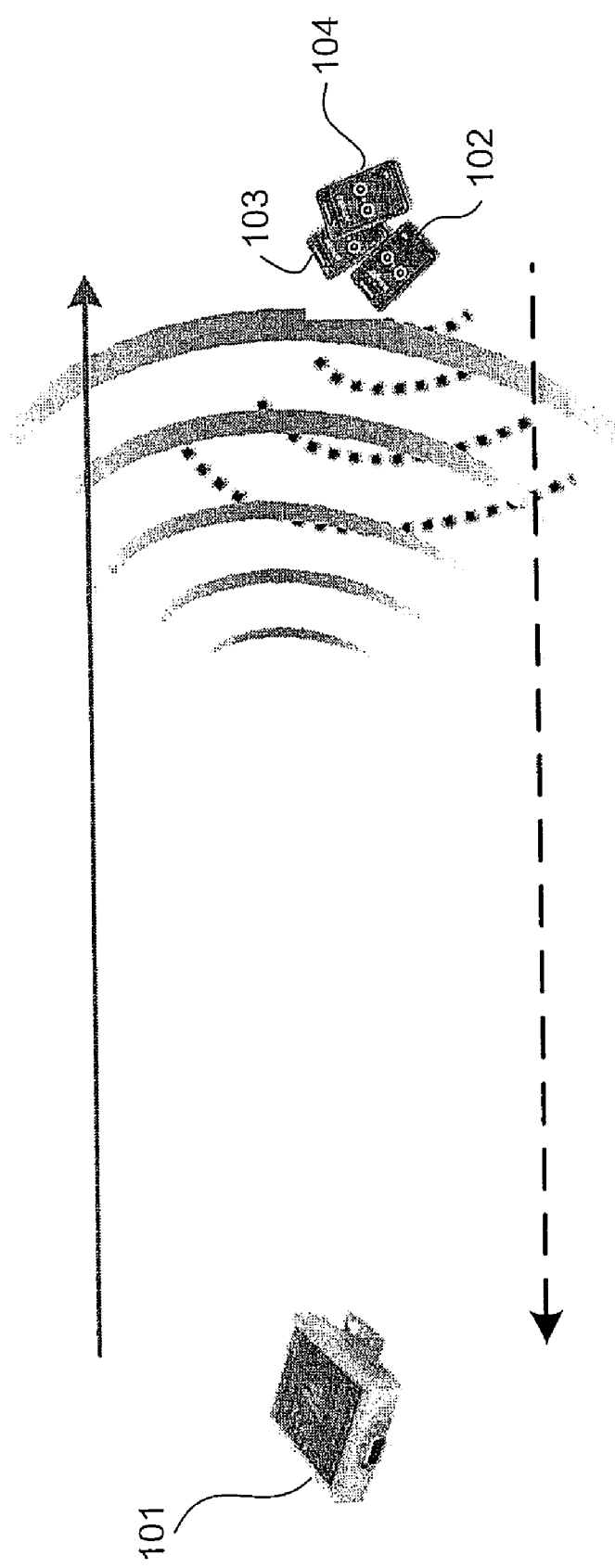
FIG. 1 is a schematic diagram showing a conventional RFID system of a tag reader and several RFID tags.
Figure 2:
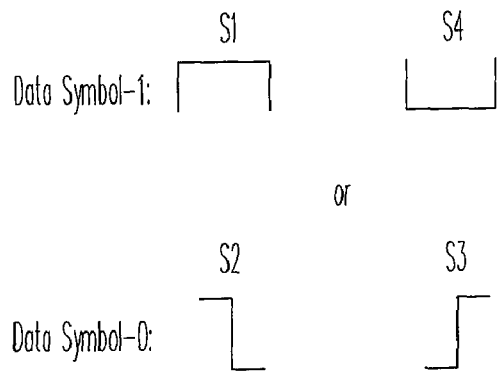
FIG. 2 is a schematic diagram showing data symbols according to the FM0 modulation scheme.

Reference will now be made in detail to the present preferred embodiments of the invention, examples of which are illustrated in the accompanying drawings. Wherever possible, the same reference numbers are used in the drawings and the description to refer to the same or like parts.

Figure 4:
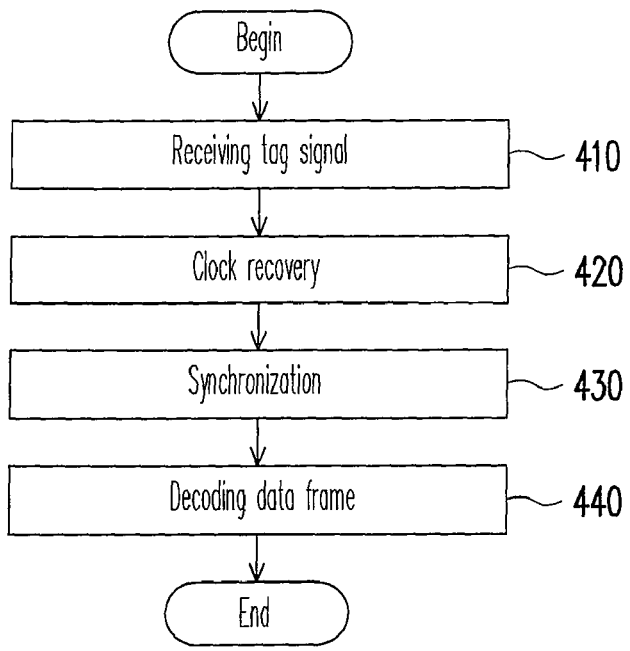
FIG. 4 is a summary flow chart of the method for reading RFID tags according to an embodiment of the present invention.

In a typical tag signal, the data sent by an RFID tag is sequentially repeated. Each repeat of the tag data is contained in a data frame. Each data frame is preceded by a preamble. Each of the preambles and the data frames consists of multiple symbols. FIG. 4 is a summary flow chart of a method for reading an RFID tag according to an embodiment of the present invention. First, receive a tag signal backscattered from an RFID tag (step 410), and then recover the data clock rate of the tag signal (step 420). After the data clock rate is known, synchronization is performed to determine a frame synchronization point between a preamble and a data frame following the preamble (step 430). This frame synchronization point is where the preamble ends and where the data frame begins. After the data clock rate and the frame synchronization point are known, the flow proceeds to decode the data frame to obtain the tag data (step 440).

Although the data clock rate of a printed RFID tag drifts due to circuit variation, this drift is relatively slow compared to a symbol period, and the steps of the method in this embodiment is adaptive to the clock drift. Therefore the data clock rate recovered from the tag signal can be used to determine the frame synchronization point. The recovered data clock rate can also be used as a beginning clock rate to decode the data frame following the frame synchronization point. The details of the steps in FIG. 4 are discussed below.

Figure 5:
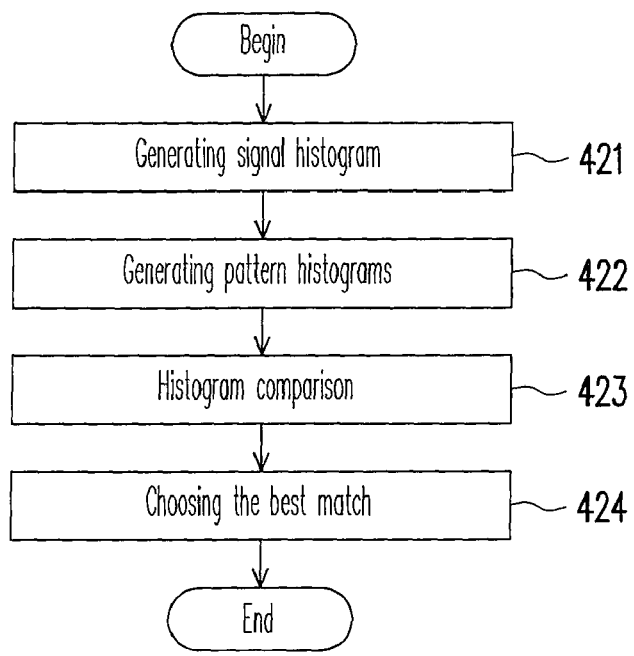
FIG. 5 is a flow chart showing the detailed flow of the clock recovery stage according to an embodiment of the present invention.
Figure 6A:
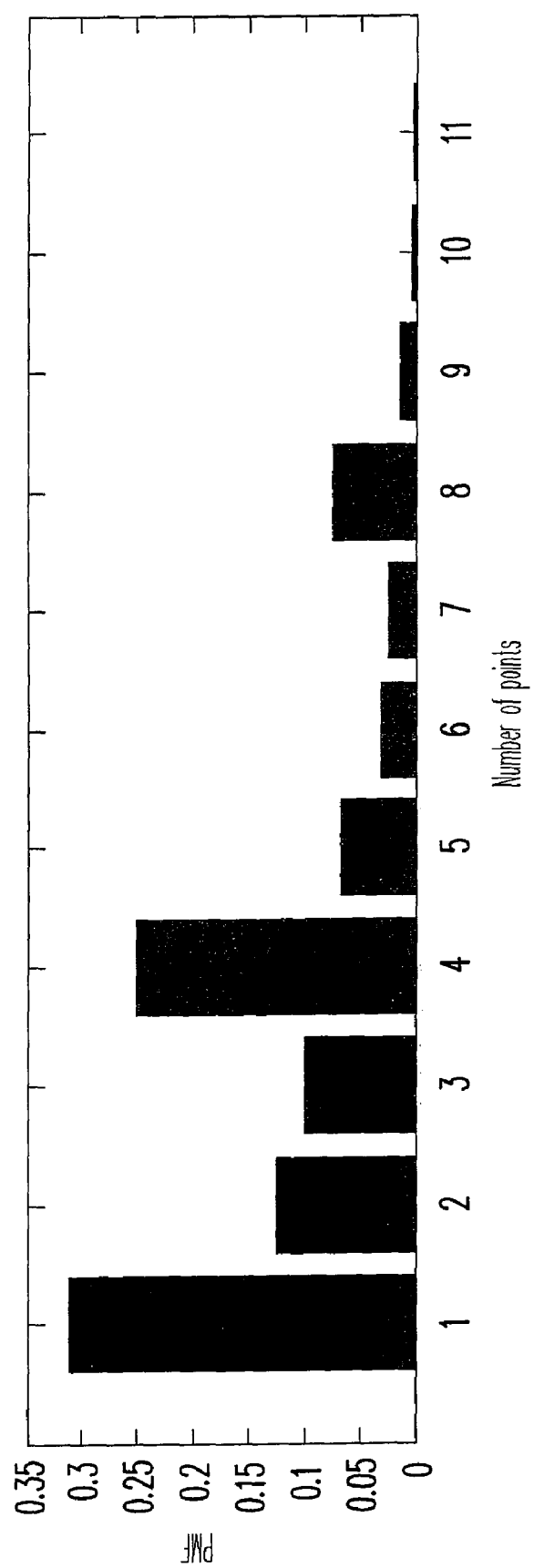
FIG. 6A is a signal histogram of a noisy received signal according to an embodiment of the present invention.

In this embodiment, the step of clock recovery (step 420 in FIG. 4) may be further divided into four steps shown as 421-424 in FIG. 5. First, a signal histogram is generated according to the statistics of pulse lengths of the tag signal (step 421). Take the FM0 modulation scheme as an example. Here a pulse means a section of the tag signal without level transition (without middle line crossing). The pulse length means the length between two consecutive level transitions of the tag signal. FIG. 6A shows such a signal histogram of a noisy tag signal from a printed RFID tag. The signal histogram in FIG. 6A shows the probability statistics of pulse lengths of the tag signal. The vertical axis of the signal histogram is the probability given by the probability mass function (PMF) of the pulse length. The horizontal axis of the signal histogram is the pulse length. The unit for the pulse length is the number of sampling points in a pulse. Samples of the tag signal are taken by the RFID tag reader at fixed and predetermined time intervals. As shown in FIG. 6A, very short pulses with a length of one point dominate the histogram because of severe noises.

Figure 6D:
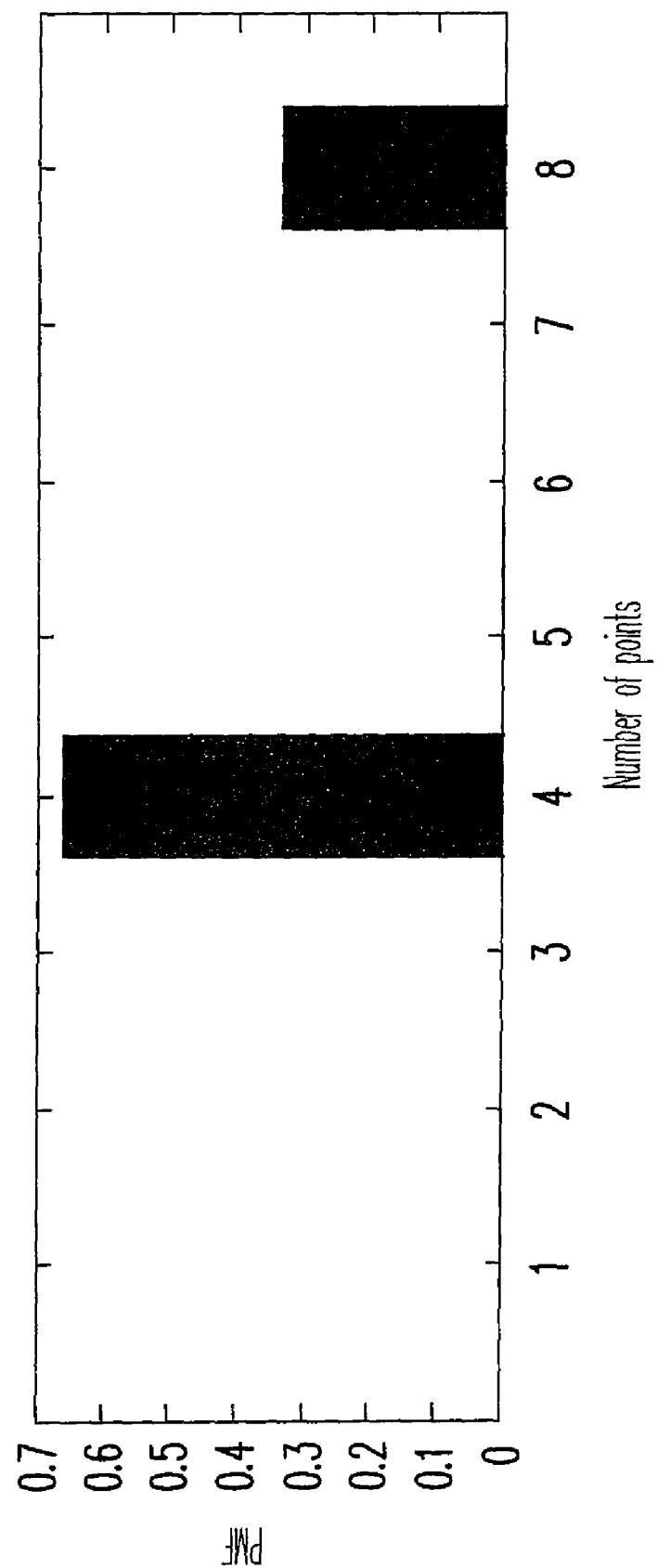

After the signal histogram is generated, the flow proceeds to generate a plurality of pattern histograms (step 422). Each of the pattern histograms is generated according to statistics of pulse lengths of the modulation scheme of the tag signal (FM0 in this embodiment) corresponding to a predetermined clock rate, and the predetermined clock rates of the pattern histograms are picked at predetermined intervals in a predetermined range. For example, FIGS. 6B-6D shows three pattern histograms generated in this way. Each of the pattern histograms in FIGS. 6B-6D represents the noise-free possibility statistics of pulse lengths of the FM0 modulation scheme corresponding to a predetermined clock rate. As shown in FIG. 2 and FIGS. 6B-6D, there are two types of pulses, namely the short pulses and the long pulses, according to the FM0 modulation scheme. The probability of the short pulses is twice the probability of the long pulses. If the predetermined clock rate corresponding to a pattern histogram is four times as high as the sampling frequency of the RFID tag reader, the generated pattern histogram is shown in FIG. 6B. If the predetermined clock rate corresponding to a pattern histogram is six times as high as the sampling frequency, the generated pattern histogram is shown in FIG. 6C. If the predetermined clock rate corresponding to a pattern histogram is eight times as high as the sampling frequency, the generated pattern histogram is shown in FIG. 6D. It is recommended to set the predetermined range of the predetermined clock rates so that the predetermined range covers the possible range of data clock rates of the printed RFID tag.

After the pattern histograms are generated, the flow proceeds to compare the signal histogram with each of the pattern histograms (step 423), and then chooses the predetermined clock rate corresponding to the pattern histogram which most closely matches the signal histogram as the data clock rate of the tag signal (step 424). For example, this embodiment may choose the pattern histogram with the minimum matching error among all pattern histograms.

For better clock recovery, in other embodiments of the present invention, noise-free impulses in the pattern histograms may be replaced with Gaussian profiles based on the noise-free impulses. Pattern histograms with Gaussian profiles match better against signal histograms of noisy tag signals, resulting in recovered data clock rates that are more accurate. Besides, in other embodiments of the present invention, pattern histograms may be generated in advance and be used repeatedly later, since pattern histograms are not related to individual tag signals. In this case, after the pattern histograms are generated, step 422 may be omitted in every subsequent tag reading process.

Figure 3:
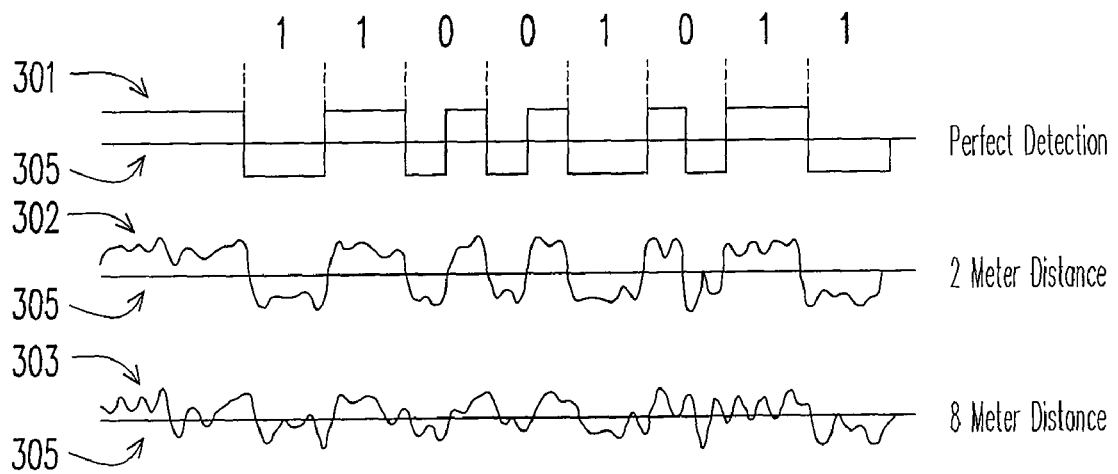
FIG. 3 is a schematic diagram showing a noise-free waveform and two noisy waveforms of typical signals from RFID tags.
Figure 7:
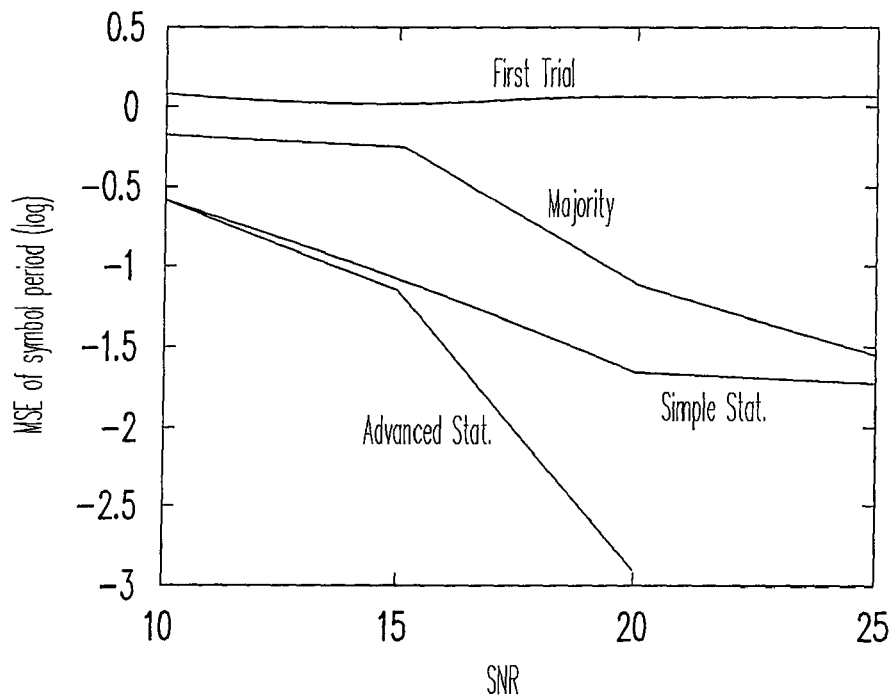
FIG. 7 is a schematic diagram showing a comparison of two clock recovery methods according to an embodiment of the present invention against two conventional methods.

FIG. 7 is a schematic diagram showing the comparison of two clock recovery methods according to this embodiment against two conventional methods. The vertical axis in FIG. 7 is the mean square error (MSE) of symbol periods recovered by the methods, in logarithmic scale. A lower MSE means a better performance of clock recovery. The horizontal axis in FIG. 7 is the signal-to-noise ratio (SNR) of the received tag signal. The lower the SNR, the noisier the tag signal is. There are four methods compared in total, namely, First Trial, Majority, Simple Statistics, and Advanced Statistics. First Trial is a conventional method which just picks the pulse length of the first level transition of the tag signal and assigns the inverse of the symbol period as the data clock rate. This approach is obviously very simple, and can only work well when the SNR is very stable and very high, which is almost impossible for printed RFID tags. Majority is another conventional method which obtains the pulse lengths of several level transitions of the tag signal and then calculates the symbol period by averaging the pulse lengths or by majority vote. The inverse of the calculated symbol period is then assigned as the data clock rate. This approach is more complicated and can perform slightly better when the SNR is above moderate level. However, as shown in the waveform 303 in FIG. 3, when the SNR is high, severe noises cause many false level transitions. Both First Trial and Majority do not perform well due to the resultant short pulses. Simple Statistics is a clock recovery method according to this embodiment using pattern histograms containing noise-free impulses, while Advanced Statistics is another clock recovery method according to this embodiment using pattern histograms containing Gaussian profiles. As shown in FIG. 7, the two methods according to this embodiment perform better than the two conventional methods no matter the SNR is low or high. In addition, Advanced Statistics performs better then Simple Statistics.

After data clock recovery, the next stage is determining the frame synchronization point of a data frame following a preamble in the tag signal. This embodiment performs a signal correlation between the preamble and a predetermined signal pattern according to the data clock rate. More specifically, the predetermined signal pattern is the preamble pattern defined in the standard specification to which the printed RFID tag conforms. Besides, the signal correlation used in this embodiment is window-sliding correlation. Since the frame synchronization point is where the preamble ends and where the data frame begins, this embodiment determines the location of the preamble in the tag signal by signal correlation, and then the location of the following data frame in the tag signal can be easily determined.

Figure 8:
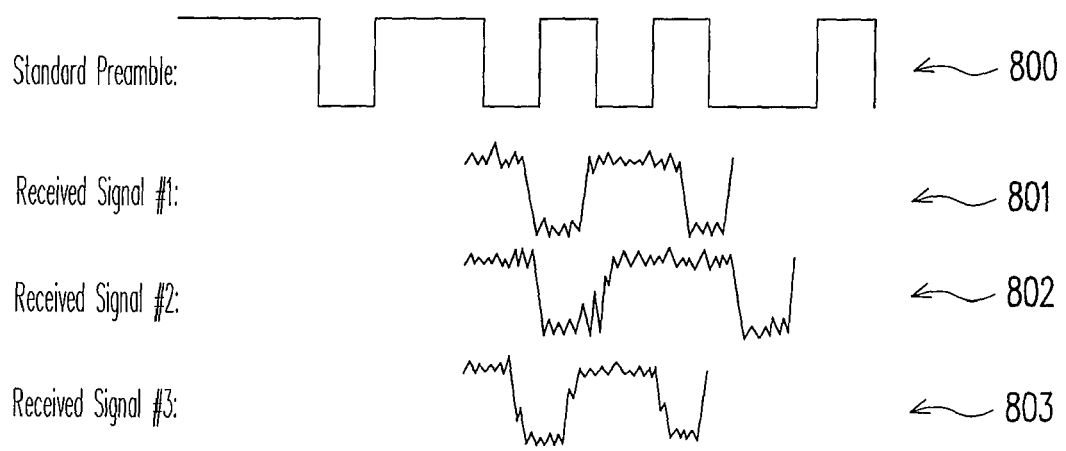
FIG. 8 is a schematic diagram showing a standard preamble pattern and several received preamble waveforms according to an embodiment of the present invention.

Now please refer to FIG. 8, which is a schematic diagram showing the preamble pattern 800 defined in the standard specification and the received preamble waveforms 801-803 based on three different data clock rates. The preamble pattern 800 is defined in the specification and is well known. The preambles 801-803 are similar to the preamble pattern 800. The differences between the preamble pattern 800 and the preambles 801-803 result from noises and data clock drift. The window-sliding correlation in this embodiment means sliding the received preamble waveform from left to right across the standard preamble pattern 800. The data frame starts at the point where these two patterns fit the best. The data clock rate recovered in step 420 is just an estimation of the data clock rate of the received preamble. The window-sliding correlation can still work well even if there is some degree of clock rate mismatch between the estimation and the received preamble waveform. The correlation will fail if the difference of the data clock rate between the estimation and the received preamble waveform is too much. This is why the data clock rate has to be estimated before the data frame synchronization. The estimated data clock rate in step 420 provides a good reference point for the signal correlation. Please note that the length of the standard preamble pattern 800 may be crucial to the accuracy of the synchronization. The longer the preamble pattern 800, the better the synchronization accuracy.

Figure 9:
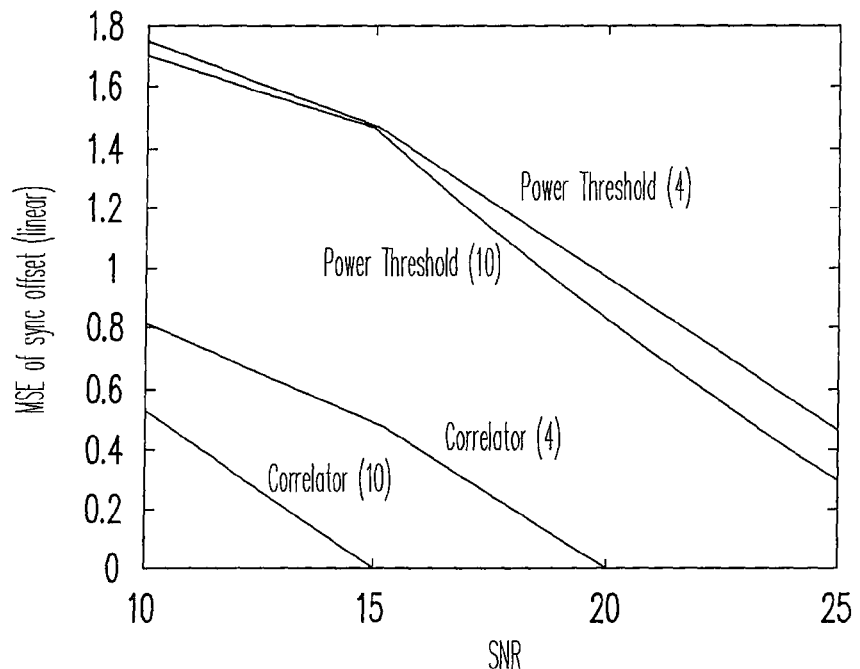
FIG. 9 is a schematic diagram showing a comparison of the synchronization method according to an embodiment of the present invention against a conventional method.

FIG. 9 is a schematic diagram showing the comparison of the synchronization method according to this embodiment against a conventional synchronization method. The vertical axis in FIG. 9 is the MSE of synchronization offset in linear scale. The horizontal axis in FIG. 9 is the SNR of the received tag signal. Power Threshold is a conventional synchronization method which considers the first level transition of the received tag signal as the beginning of the data frame. There are two variations of Power Threshold in this comparison. The first variation synchronizes tag signals with preambles of four symbols in length. The second variation synchronizes tag signals with preambles of ten symbols in length. Correlator is the synchronization method according to this embodiment. Likewise, there are two variations of Correlator in this comparison. The first variation deals with preambles of four symbols in length. The second variation deals with preambles of ten symbols in length. As shown in FIG. 9, Correlator performs much better than Power Threshold and long preambles are better than short preambles.

Figure 10:
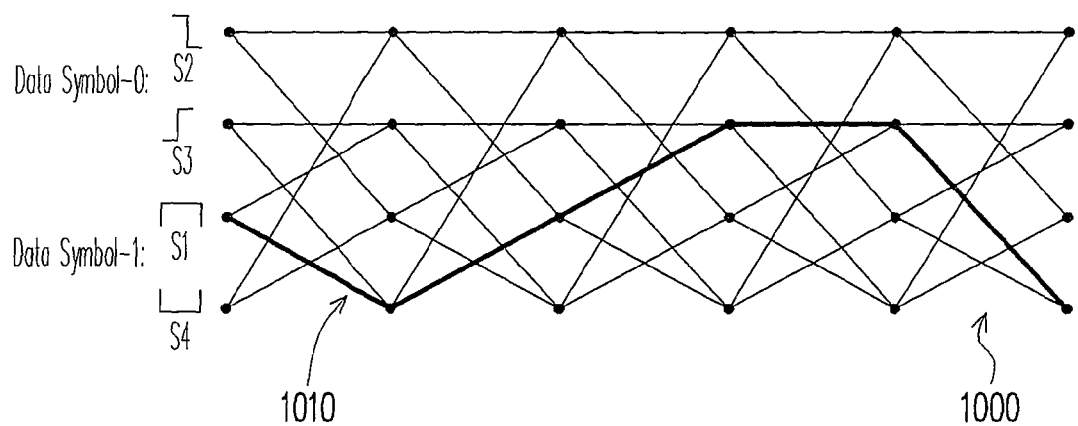
FIG. 10 shows a conventional trellis diagram in FM0 modulated signal.
Figure 11:
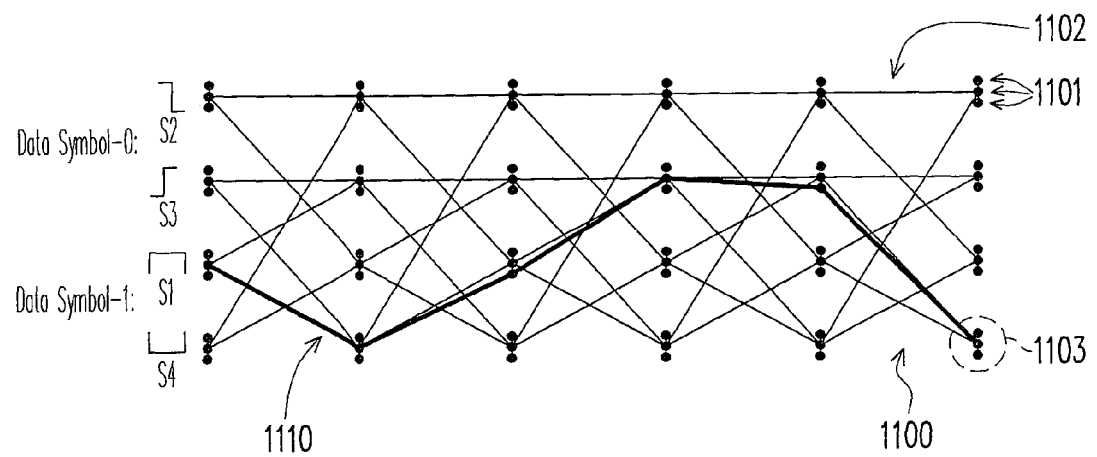
FIG. 11 is a schematic diagram showing an extended FM0 trellis diagram used in an embodiment of the present invention.

After the frame synchronization point is determined, the next step is decoding the data frame in order to reconstruct the data from the tag. To overcome noises and data clock drift, this embodiment decodes the data frame by using an adaptive Viterbi algorithm on an extended trellis diagram. The extended trellis diagram is an extension of a conventional trellis diagram. For example, FIG. 10 shows a conventional trellis diagram 1000 and FIG. 11 shows an extended trellis diagram 1100 derived from the conventional FM0 trellis diagram 1000. The extended FM0 trellis diagram 1100 includes a plurality of nodes (such as the nodes 1101) and a plurality of branches (such as the branch 1102) connecting the nodes. The nodes and the branches are arranged according to the modulation scheme of the data frame (FM0 in this embodiment) and possible variations of the data clock rate.

As shown in FIG. 11, the nodes constitute a plurality of supernodes. Each of the supernodes includes three nodes, such as the supernode 1103. The supernodes of the extended trellis diagram 1100 are analogous to the nodes of the conventional trellis diagram 1000. They are arranged according to possible symbol sequences of the modulation scheme of the data frame. On the other hand, the nodes of each of the supernodes are arranged according to the possible variations of the data clock rate. The upper node in a supernode means the data clock rate of the current symbol is that of the previous symbol minus a predetermined clock rate unit. For example, the predetermined clock rate unit may be the sampling frequency of the RFID tag reader. The middle node in a supernode means the data clock rate of the current symbol is the same as that of the previous symbol. The lower node in a supernode means the data clock rate of the current symbol is that of the previous symbol plus the predetermined clock rate unit. As a result, applying the adaptive Viterbi algorithm on the extended trellis diagram 1100 solves the problems of noises and data clock drift.

The supernodes in the extended trellis diagram 1100 may be expanded to include more nodes. For example, each supernode may include five nodes instead of three. The new uppermost node in a supernode means the data clock rate of the current symbol is that of the previous symbol minus two predetermined clock rate units. The new lowermost node in a supernode means the data clock rate of the current symbol is that of the previous symbol plus two predetermined clock rate units. The meanings of the other three nodes in a supernode remain the same. In this way, each of the supernodes may be further expanded to include more nodes to adapt to wider ranges of data clock drift. The general rule is that there must be a one-to-one correspondence between the nodes of each supernode and a plurality of predetermined clock rates. Furthermore, the predetermined clock rates should be picked at predetermined intervals in a predetermined range covering the possible variations of the data clock rate during the data frame.

This embodiment uses an adaptive Viterbi algorithm to decode the data frame. This adaptive Viterbi algorithm is adaptive in some degree to the drift of the data clock rate and the timing variation the frame synchronization point. Decoding the data frame may be divided into three steps. The first step is regarding each of the supernodes as a single node and finding a first trellis path with the minimum error among all trellis paths corresponding to all possible state transitions in the extended trellis diagram 1100. This is equivalent to finding the minimum error path in the conventional trellis diagram 1000, such as the marked path 1010. The second step is finding a second trellis path with the minimum error among all trellis paths connecting one node in each of the supernodes on the first trellis path, such as the marked path 1110. Finally, the third step is providing the leftmost symbol indicated by the second trellis path as a result of decoding the data frame.

Figure 12:
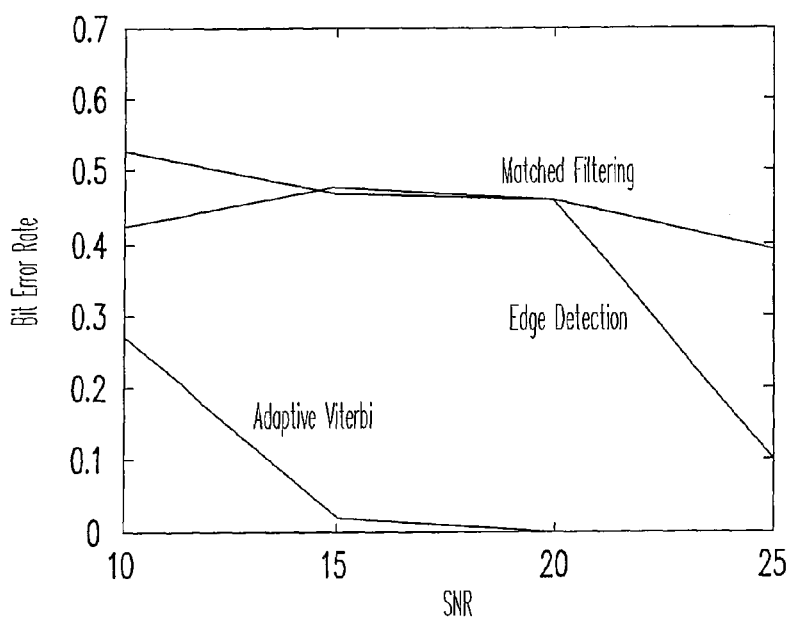
FIG. 12 is a schematic diagram showing a comparison of the decoding method according to an embodiment of the present invention against two conventional methods.

FIG. 12 is a schematic diagram showing a comparison of the decoding method according to this embodiment against two conventional methods. The vertical axis in FIG. 12 is the bit error rate of the methods. The horizontal axis in FIG. 12 is the SNR of the received tag signal. Edge Detection and Matched Filtering are both aforementioned conventional decoding methods. Adaptive Viterbi is the decoding method according to this embodiment. As shown in FIG. 12, Adaptive Viterbi has the lowest bit error rate no matter the SNR is low or high.

Figure 13:
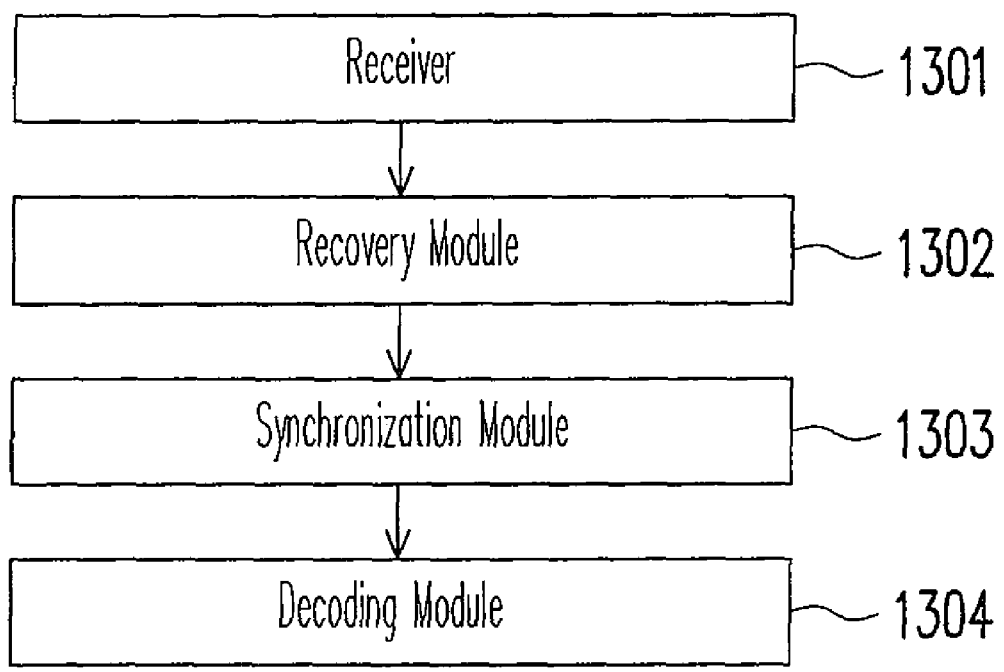
FIG. 13 is a schematic diagram showing a system for reading RFID tags according to an embodiment of the present invention.

In addition to the method for reading RFID tags demonstrated by the above embodiments, the present invention also comprehends a system for reading RFID tags. Please refer to FIG. 13, which is a schematic diagram showing a system 1300 for reading RFID tags according to another embodiment of the present invention. The system 1300 includes a receiver 1301, a recovery module 1302, a synchronization module 1303, and a decoding module 1304. The recovery module 1302 is coupled to the receiver 1301. The synchronization module 1303 is coupled to the recovery module 1302. The decoding module 1304 is coupled to the synchronization module 1303. The receiver 1301 receives a tag signal from an RFID tag. The recovery module 1302 recovers the data clock rate from the tag signal according to statistics of pulse lengths of the tag signal. The synchronization module 1303 determines the frame synchronization point of a data frame following a preamble in the tag signal by a signal correlation between the preamble and a predetermined signal pattern according to the data clock rate. The decoding module 1304 decodes the data frame by using an adaptive Viterbi algorithm on an extended trellis diagram.

In fact, the system 1300 executes the method for reading RFID tags whose flow is shown in FIG. 4. There is an analogy between the flow in FIG. 4 and the system 1300. The receiver 1301 executes step 410. The recovery module 1302 executes step 420. The synchronization module 1303 executes step 430. The decoding module 1304 executes step 440. Since the technical details of steps 410-440 are already disclosed in the above embodiments of the present invention, they are not further discussed here.

In summary, the method and the system proposed by the present invention recover the data clock rate of the tag signal using signal statistics, determine the frame synchronization point with signal pattern correlation, and decoding the data frame with adaptive Viterbi algorithm and extended trellis diagrams. As a result, the method and the system proposed by the present invention have better performance than conventional methods for decoding noisy signals from printed RFID tags. In some degree, the adaptive Viterbi algorithm tolerates data clock drift and deviation of frame synchronization points. Therefore the data clock rate estimated at the recovery stage and the frame synchronization point determined at the synchronization stage do not have to be very precise. This helps to overcome the constantly drifting data clock of printed RFID tags. The performance of the method and the system proposed by the present invention approximates the performance of a maximum likelihood (ML) decoder. However, the complexity of the method and the system of the present invention is far lower than that of the ML decoder because the method and the system just trace symbol boundary instead of calculating the boundary of every symbol, which the ML decoder does. Moreover, although in the above embodiments the method and the system are used for reading printed RFID tags, the method and the system also have excellent performance for reading other types of RFID tags, such as non-printed RFID tags and tags which conform to the electronic product code (EPC) class 1/generation 2 standard.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for reading an RFID tag, comprising:
   (a) receiving a tag signal from the RFID tag;
   (b) recovering a data clock rate from the tag signal according to statistics of pulse lengths of the tag signal;
   (c) determining a frame synchronization point of a data frame following a preamble in the tag signal by a signal correlation between the preamble and a predetermined signal pattern according to the data clock rate; and
   (d) decoding the data frame by using an adaptive Viterbi algorithm on an extended trellis diagram, wherein the nodes and the branches of the extended trellis diagram are arranged according to possible variations of the data clock rate.

2. The method of claim 1, wherein step (b) further comprises:
   generating a signal histogram according to the statistics of pulse lengths of the tag signal;
   generating a plurality of pattern histograms, wherein each of the pattern histograms is generated according to statistics of pulse lengths of the modulation scheme of the tag signal corresponding to a predetermined clock rate, and the predetermined clock rates are picked at predetermined intervals in a predetermined range;
   comparing the signal histogram with each of the pattern histograms; and
   choosing the predetermined clock rate corresponding to the pattern histogram which most closely matches the signal histogram as the data clock rate.

3. The method of claim 2, wherein the predetermined range is the possible range of data clock rates of the RFID tag.

4. The method of claim 2, wherein each of the pattern histograms represents the noise-free possibility statistics of pulse lengths of the modulation scheme of the tag signal corresponding to the predetermined clock rate.

5. The method of claim 2, wherein each of the pattern histograms comprises Gaussian profiles based on the noise-free possibility statistics of pulse lengths of the modulation scheme of the tag signal corresponding to the predetermined clock rate.

6. The method of claim 1, wherein the predetermined signal pattern is a preamble pattern defined in a standard specification to which the RFID tag conforms.

7. The method of claim 1, wherein the signal correlation is a window-sliding correlation.

8. The method of claim 1, wherein the nodes constitute a plurality of supernodes and each of the supernodes comprises a plurality of the nodes.

9. The method of claim 8, wherein the supernodes are arranged according to the modulation scheme of the data frame.

10. The method of claim 8, wherein the nodes of each of the supernodes are arranged according to the possible variations of the data clock rate.

11. The method of claim 8, wherein there is a one-to-one correspondence between the nodes of each of the supernodes and a plurality of predetermined clock rates.

12. The method of claim 11, wherein the predetermined clock rates are picked at predetermined intervals in a predetermined range.

13. The method of claim 12, wherein the predetermined range covers the possible variations of the data clock rate during the data frame.

14. The method of claim 8, wherein step (d) further comprises:
regarding each of the supernodes as a single node and finding a first trellis path with the minimum error among all trellis paths corresponding to all possible state transitions in the extended trellis diagram;
finding a second trellis path with the minimum error among all trellis paths connecting one node in each of the supernodes on the first trellis path; and
providing a symbol indicated by the second trellis path as a result of decoding the data frame.

15. A system for reading an RFID tag, comprising:
a receiver for receiving a tag signal from the RFID tag;
a recovery module coupled to the receiver for recovering a data clock rate from the tag signal according to statistics of pulse lengths of the tag signal;
a synchronization module coupled to the recovery module for determining a frame synchronization point of a data frame following a preamble in the tag signal by a signal correlation between the preamble and a predetermined signal pattern according to the data clock rate; and
a decoding module coupled to the synchronization module for decoding the data frame by using an adaptive Viterbi algorithm on an extended trellis diagram, wherein the nodes and the branches of the extended trellis diagram are arranged according to possible variations of the data clock rate.

16. The system of claim 15, wherein the recovery module generates a signal histogram according to the statistics of pulse lengths of the tag signal.

17. The system of claim 16, wherein the recovery module also generates a plurality of pattern histograms, each of the pattern histograms is generated according to statistics of pulse lengths of the modulation scheme of the tag signal corresponding to a predetermined clock rate.

18. The system of claim 17, wherein the predetermined clock rates are picked at predetermined intervals in a predetermined range.

19. The system of claim 18, wherein the predetermined range is the possible range of data clock rates of the RFID tag.

20. The system of claim 17, wherein the recovery module compares the signal histogram with each of the pattern histograms, and then chooses the predetermined clock rate corresponding to the pattern histogram which most closely matches the signal histogram as the data clock rate.

21. The system of claim 17, wherein each of the pattern histograms represents the noise-free possibility statistics of pulse lengths of the modulation scheme of the tag signal corresponding to the predetermined clock rate.

22. The system of claim 17, wherein each of the pattern histograms comprises Gaussian profiles based on the noise-free possibility statistics of pulse lengths of the modulation scheme of the tag signal corresponding to the predetermined clock rate.

23. The system of claim 15, wherein the predetermined signal pattern is a preamble pattern defined in a standard specification to which the RFID tag conforms.

24. The system of claim 23, wherein the signal correlation is a window-sliding correlation.

25. The system of claim 15, wherein the nodes constitute a plurality of supernodes, each of the supernodes comprises a plurality of the nodes.

26. The system of claim 25, wherein the supernodes are arranged according to the modulation scheme of the data frame.

27. The system of claim 25, wherein the nodes of each of the supernodes are arranged according to the possible variations of the data clock rate.

28. The system of claim 25, wherein there is a one-to-one correspondence between the nodes of each of the supernodes and a plurality of predetermined clock rates.

29. The system of claim 28, wherein the predetermined clock rates are picked at predetermined intervals in a predetermined range.

30. The system of claim 29, wherein the predetermined range covers the possible variations of the data clock rate during the data frame.

31. The system of claim 25, wherein the decoding module finds a first trellis path with the minimum error among all trellis paths corresponding to all possible state transitions in the extended trellis diagram, regarding each of the supernodes as a single node, and then finds a second trellis path with the minimum error among all trellis paths connecting one node in each of the supernodes on the first trellis path, and then provides a symbol indicated by the second trellis path as a result of decoding the data frame.

* * * * *